United States Patent [19]
Kakalec

[11] 4,159,514
[45] Jun. 26, 1979

[54] SIGNAL LOSS DETECTOR FOR THREE PHASE CIRCUIT

[75] Inventor: Robert J. Kakalec, Madison, N.J.

[73] Assignee: Bell Telephone Laboratories, Incorporated, Murray Hill, N.J.

[21] Appl. No.: 852,150

[22] Filed: Nov. 16, 1977

[51] Int. Cl.² .................... H02M 1/18; H02M 7/02
[52] U.S. Cl. ........................ 363/53; 361/85; 361/185; 363/75; 363/87
[58] Field of Search .............. 340/658; 361/77, 85, 361/86, 92, 185, 187; 363/52–54, 75, 125, 126, 129

[56] References Cited
U.S. PATENT DOCUMENTS

| 2,474,290 | 6/1949 | Terry et al. | 361/77 |
| 4,068,157 | 1/1978 | Bassett | 363/75 |

FOREIGN PATENT DOCUMENTS 141921 2/1961 U.S.S.R. .................... 361/85

*Primary Examiner*—William M. Shoop
*Attorney, Agent, or Firm*—Alfred G. Steinmetz

[57] ABSTRACT

A three-phase rectifier utilizes three feedback controlled ferroresonant regulators to convert a three-phase signal into a regulated DC voltage. A monitoring circuit is included which responds to a signal loss at any input phase to actuate an alarm signal.

6 Claims, 1 Drawing Figure

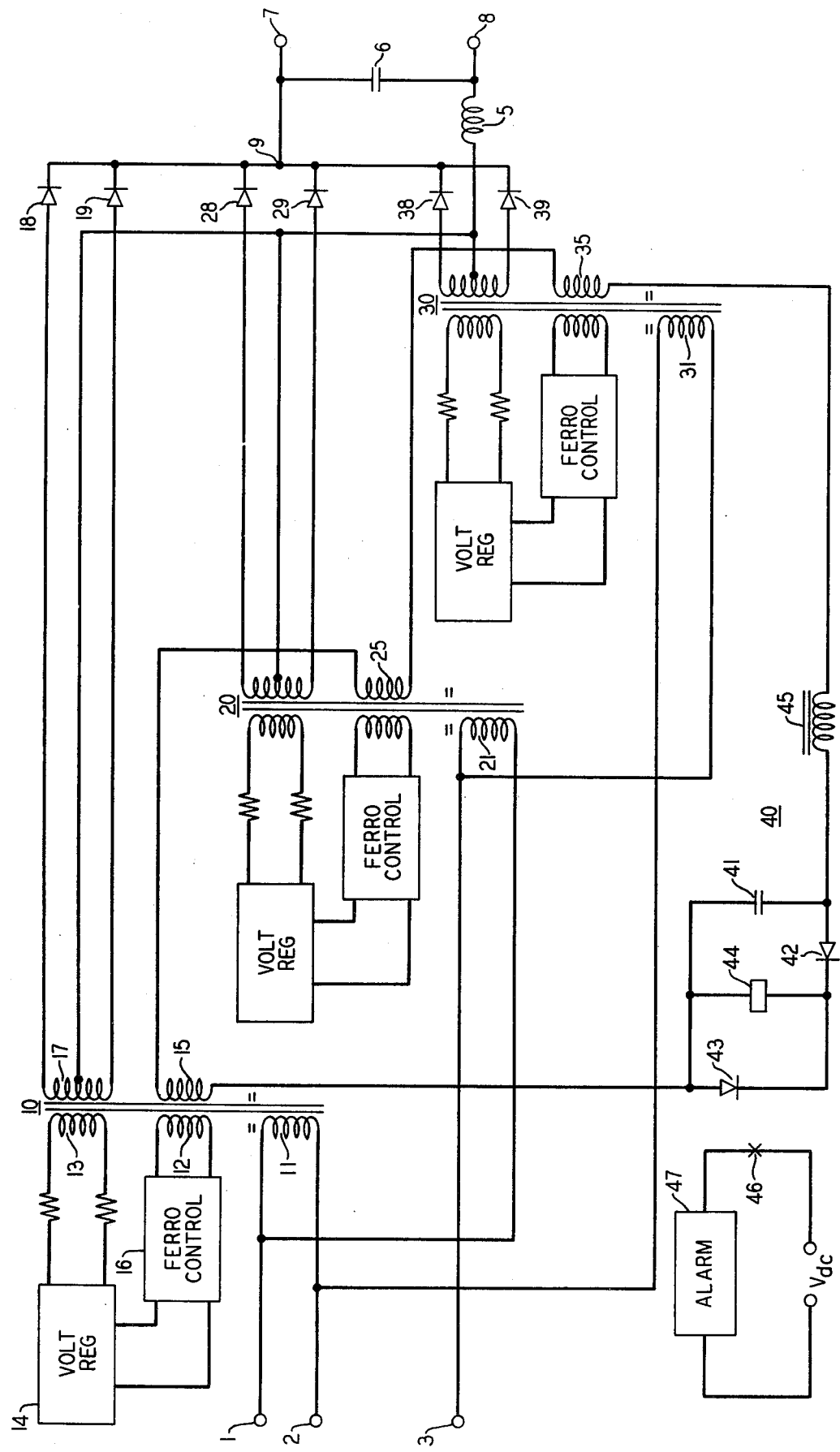

SIGNAL LOSS DETECTOR FOR THREE PHASE CIRCUIT

BACKGROUND OF THE INVENTION

1. Field of the Invention

The invention is concerned with signal monitoring arrangements and, more particularly, with a signal loss detector for three-phase circuits.

2. Description of the Prior Art

Prior signal monitoring arrangements to detect a signal or phase loss in a three-phase circuit have rectified the individual phase signals and utilized magnitude comparisons to indicate the occurrence of a signal or phase loss. A particular arrangement utilizing this technique is disclosed in U.S. Pat. No. 2,800,621 issued to Harold G. Carlson et al on July 23, 1957. The Carlson patent disclosed a three-phase voltage monitoring circuit to sense unbalanced conditions in a three-phase circuit. The monitoring circuit includes three single-phase auto transformers coupled respectively to each phase. Each transformer winding includes a high voltage tap and a relatively low voltage tap. The outputs of the high voltage tap are rectified and a DC average voltage is derived therefrom. A peak voltage level is derived from the output of the relatively low voltage taps. During normal balanced condition, the magnitude of the average voltage is greater than the peak voltage. In the event of an imbalance condition, the magnitude of the peak voltage exceeds the average voltage thereby providing an indication of the imbalance condition.

SUMMARY OF THE INVENTION

It is desirable that a signal loss detector for a three-phase circuit be economical and reliable. The prior art circuits are complicated requiring a high parts count and operate by signal magnitude comparison which is contrary to the objective of reliability and economy. While reducing complexity, a signal loss detector should respond rapidly and accurately to a signal-phase loss in a three-phase system.

Such an objective is attained in a signal phase loss detector disclosed herein. A three-phase loss detector circuit is operative to respond to the loss of a signal in one phase to operate alarm circuitry. The three-phase monitoring circuit operates by sensing the signal in each phase and deriving a facsimile AC signal proportional in magnitude and identical in phase thereto. The three facsimile AC signals are summed and applied to a filter which filters out third harmonic signals. A threshold-responsive circuit is coupled to the output of the filter. Upon the loss of a phase, a finite signal magnitude is generated at the fundamental frequency which operates the signal threshold detector and consequently indicates the loss of a particular signal phase.

The aforedescribed arrangement is advantageously low in the number of component parts needed and is extremely reliable in operation.

BRIEF DESCRIPTION OF THE DRAWING

The sole FIGURE is a combination block and schematic of a three-phase rectifier including a phase loss detector embodying the principles of the invention.

DETAILED DESCRIPTION

The sole FIGURE discloses a three-phase rectifier system to derive a regulated DC voltage from a three-phase power source. Commercial three-phase AC power is applied at the input terminals 1, 2, and 3. This power is coupled to the input transformer windings 11, 21, and 31 of the feedback controlled ferroresonant regulators 10, 20, and 30, respectively. Each regulator comprises a feedback control circuit to achieve regulation. Ferroresonant regulator 10, for example, includes the input winding 11 to which one phase of the three-phase input is applied. The output winding 17 is coupled to the output rectifying diodes 18 and 19. The output voltage magnitude is sensed through transformer winding 13 and applied to a voltage regulator circuit 14. The voltage regulator circuit 14 compares the sensed output voltage with a reference voltage and generates an error signal. This error signal is applied to the ferro control circuit 16.

The ferro control circuit 16 includes an integrator and an inductor equivalent to the saturated inductance of the regulator's transformer. The ferro control circuit 16 is operative through transformer winding 12 to simulate saturation in the transformer of the regulator in order to regulate the DC output voltage of the DC rectifying diodes 18 and 19. The details and operation of the ferroresonant regulator may be ascertained through my prior U.S. Pat. No. Re. 27,916 issued Feb. 12, 1974, which disclosed and described a closed loop ferroresonant voltage regulator which operates by simulating core saturation. The ferroresonant regulators 20 and 30 are identical to the ferroresonant regulator 10 and thus individual operation thereof is not discussed.

The combined outputs of the ferroresonant regulators 10, 20 and 30 are rectified by the rectifying diode pairs 18–19, 28–29 and 38–39, respectively, and combined at electrical node 9. The resulting DC voltage is transmitted via a low-pass filter comprising inductor 5 and capacitor 6 to the output terminals 7 and 8 at which a regulated DC voltage is maintained.

Should any signal phase of the three-phase input be lost due to a fault, et cetera the output DC voltage at terminals 7 and 8 is severely impaired. In order to maintain a constant power output, it is imperative that a phase loss be promptly detected. This detection is achieved through a phase loss detector circuit.

The phase loss detector circuit includes the three signal phase monitoring windings 15, 25 and 35. The monitoring windings 15, 25 and 35 are coupled to the transformer cores of the ferroresonant regulators 10, 20 and 30, respectively. The monitoring windings 15, 25 and 35 are connected in series. Each monitoring winding produces an AC signal which is a facsimile of the signal phase it is monitoring. That is, the facsimile signal has the same phase and frequency of the signal being monitored. Each monitoring winding 15, 25 and 35 is wound with a transformation ratio selected so that these facsimile signal magnitudes are uniformly proportional to the signal magnitude monitored in each phase. More explicitly, the transformation ratios are identical for all three phases so that the relative magnitudes of the facsimile signals are identical to the relative magnitudes of the three-phase signals being monitored.

A low-pass filter 40 comprising inductor 45 and capacitor 41 is connected in shunt across the series-connected monitor windings 15, 25 and 35. The filter is tuned to block third harmonics of the fundamental frequency of the three-phase signal and to pass signals at the fundamental frequency.

The output of the filter is rectified by a diode 42 and applied to a relay coil 44. A diode 43 shunts the coil 44 and is utilized to suppress transient signals. A relay contact 46 responds to relay coil 44, and is connected to couple a DC voltage source to operate an alarm device 47.

Under normal operating conditions, with all three signal phases operative, the facsimile AC signal of windings 15, 25 and 35 at the fundamental frequency has a continuous instantaneous sum of zero volts or, in other words, has a negligible instantaneous resultant magnitude. Hence, no signal of fundamental frequency is available to be transmitted by the low-pass filter to energize relay coil 44.

Due to the nonlinear operating characteristic of the ferroresonant regulator transformer, however, a large third harmonic signal is generated at each phase. These third harmonic signals of the three phases are all in phase and a large resultant third harmonic signal is generated. This third harmonic signal is isolated from the relay coil 44 due to the low-pass filter 40 comprising inductor 45 and capacitor 41.

If any signal phase fails due to a short, open circuit or other fault, the instantaneous sum of the facsimile AC signals at the fundamental frequency assumes a finite magnitude. This finite signal is transmitted by the low-pass filter and rectified by diode 42 to derive a DC signal to energize relay coil 44. The energized relay coil 44 operates contact 46 which connects an alarm device 47 to the DC voltage. The activated alarm device 47, which may be a lamp, indicates that a phase loss has occurred.

While the foregoing phase loss monitor has been described as being operative in response to a signal at the fundamental frequency, it is readily apparent to those skilled in the art that detection arrangements responsive to the third harmonic signal can be devised without departing from the spirit and scope of the invention.

What is claimed is:

1. A phase loss detector for a three phase circuit comprising:
   first, second, and third sensing means coupled to each phase and operative to produce a facsimile signal of each signal phase;
   said first, second, and third sensing means connected in series so the facsimile signals are continuously summed;
   signal elimination means for blocking odd harmonic signals having a frequency higher than a fundamental frequency of said facsimile signal and coupled in series with said first, second, and third sensing means; and
   threshold responsive means coupled to an output of said signal elimination means.

2. A phase loss detector as defined in claim 1 wherein said first, second, and third sensing means are operative to produce signals signal uniformly proportional in magnitude to signals in each phase of the three phase circuit.

3. Circuitry for detecting a signal loss in any phase of a three-phase circuit comprising:
   first, second and third sensing means for producing first, second and third facsimile AC signals representative of a signal condition in each phase;
   means for summing said first, second and third facsimile AC signals;
   filter means coupled to said means for summing and operative to pass signals of a fundamental frequency of said facsimile AC signal and block odd harmonic signals having a higher frequency than the said fundamental frequency; and
   signal magnitude responsive means coupled to an output of said filter means, whereby a signal magnitude applied thereto indicates a signal loss in any phase of said three-phase circuit.

4. Circuitry as defined in claim 3 wherein said first, second, and third sensing means comprise first, second, and third transformer sensing windings coupled to transformers in a three phase system, and
   said means for summing comprises a series connection of said first, second, and third transformer sensing windings.

5. A three phase rectifier including input means to accept a three phase source,
   a three phase transformer arrangement coupled to be energized through said input means,
   a first, second, and third sense winding coupled to each phase of the three phase transformer arrangement, respectively,
   said first, second, and third sense windings connected in series to sum signals sensed thereby,
   a filter coupled to an output of the first, second, and third sense windings connected in series and operative to block off harmonic signals having a higher frequency than a fundamental signal frequency of a signal occurring in each phase monitored, and
   a signal threshold detector coupled to an output of said filter and operative to detect a signal magnitude indicative of a phase loss.

6. A three phase rectifier as defined in claim 5 wherein said first, second, and third sense windings have a uniform transformation ratio with respect to an input of said three phase transformer arrangement.

* * * * *

UNITED STATES PATENT AND TRADEMARK OFFICE
CERTIFICATE OF CORRECTION

PATENT NO. : 4,159,514
DATED : June 26, 1979
INVENTOR(S) : Robert J. Kakalec

It is certified that error appears in the above-identified patent and that said Letters Patent are hereby corrected as shown below:

Column 4, line 5, "signals signal" should read --facsimile signals--; line 43, "block off harmonic" should read --block odd harmonic--.

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*